United States Patent
Firor

(10) Patent No.: US 12,013,039 B2
(45) Date of Patent: Jun. 18, 2024

(54) COMPACT LOW FRICTION HIGH TEMPERATURE SHAFT SEAL AND ATTACHMENT

(71) Applicant: Raytheon Company, Waltham, MA (US)

(72) Inventor: Randall S. Firor, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 385 days.

(21) Appl. No.: 16/841,378

(22) Filed: Apr. 6, 2020

(65) Prior Publication Data
US 2021/0310562 A1    Oct. 7, 2021

(51) Int. Cl.
*F16J 15/3284*    (2016.01)
*F42B 10/02*    (2006.01)
*F42B 14/06*    (2006.01)

(52) U.S. Cl.
CPC .......... *F16J 15/3284* (2013.01); *F42B 10/02* (2013.01); *F42B 14/067* (2013.01)

(58) Field of Classification Search
CPC ...... F16J 15/3284; F16J 15/34; F16J 15/3436; F16J 15/3464; F16J 15/3472; F16J 15/3476; F42B 10/02; F42B 14/067
See application file for complete search history.

(56) References Cited

U.S. PATENT DOCUMENTS

| | | | | |
|---|---|---|---|---|
| 4,875,786 A | * | 10/1989 | DeWachter | F16C 33/76 384/903 |
| 4,968,044 A | * | 11/1990 | Petrak | F16J 15/3456 384/140 |
| 6,311,983 B1 | * | 11/2001 | Burcham | F16J 15/44 415/113 |
| 6,761,330 B1 | | 7/2004 | Bittle et al. | |
| 7,938,407 B2 | | 5/2011 | Datta et al. | |
| 8,319,163 B2 | | 11/2012 | Flood et al. | |
| 8,967,627 B2 | * | 3/2015 | Jahn | F01D 11/003 277/352 |
| 10,392,953 B2 | * | 8/2019 | Miller | F01D 11/003 |
| 2005/0248093 A1 | * | 11/2005 | Keba | F16J 15/004 277/358 |
| 2011/0233872 A1 | * | 9/2011 | Iguchi | F16J 15/3424 277/400 |
| 2012/0043725 A1 | * | 2/2012 | Jahn | F02C 7/28 277/306 |

FOREIGN PATENT DOCUMENTS

CN    207454773    11/2017
EP    2420649 A2    2/2012

OTHER PUBLICATIONS

International Search Report and Written Opinion of the International Searching Authority in connection with International Patent Application No. PCT/US2020/054147 dated Dec. 21, 2020, 10 pages.

* cited by examiner

*Primary Examiner* — Gilbert Y Lee

(57) ABSTRACT

An assembly and method for assembling a projectile with a compact low friction high temperature shaft seal is provided. The assembly includes an outer shell, a rotating shaft inside the outer shell, and a seal attached to the rotating shaft. The rotating shaft can rotate independently of the outer shell. The seal can seal a gap between the outer shell and the rotating shaft.

20 Claims, 3 Drawing Sheets

COMPACT LOW FRICTION HIGH TEMPERATURE SHAFT SEAL AND ATTACHMENT

TECHNICAL FIELD

This disclosure is directed in general to shaft seals. More specifically, this disclosure relates to a compact low friction high temperature shaft seal and attachment.

BACKGROUND

At high speeds a projectile can experience extreme temperatures. For hypersonic projectiles with moving or rotating components, a small gap can expose the inside of the projectile to the overheated air caused by the friction of the projectile.

SUMMARY

This disclosure provides a compact low friction high temperature shaft seal and attachment.

In a first embodiment, an assembly is provided. The assembly includes an outer shell, a rotating shaft inside the outer shell, and a seal attached to the rotating shaft. The rotating shaft can rotate independently of the outer shell. The seal can seal a gap between the outer shell and the rotating shaft.

In some embodiments, the assembly further includes a press ring applied to the rotating shaft to secure the seal. The seal may not be attached using any fastener other than the press ring.

In some embodiments, the assembly further includes an adjustment spacer to align the seal with a back end of the outer shell. The adjustment spacer is applied to the rotating shaft between a flange of the rotating shaft and the seal. The press ring provides pressure on the seal against the adjustment spacer to secure the seal.

In some embodiments, a material of the seal is based on a flexibility of the seal corresponding to movement of a back end of the outer shell due to expansion forces experienced as the assembly moves at hypersonic speeds. The material of the seal is based on a friction coefficient of the material.

In some embodiments, a maximum length of the seal is based on an expansion of a radius of the rotating shaft due to dynamic loads and a reduced thickness of the outer shell. A minimum length of the seal is based on a contraction of a radius of the rotating shaft due to dynamic loads and a regular thickness of the outer shell.

In a second embodiment, a method for assembling a projectile with a compact low friction high temperature shaft seal is provided. The projectile includes an outer shell and a rotating shaft inside the outer shell. The method includes attaching a seal to the rotating shaft; and sealing a gap between the outer shell and the rotating shaft using the seal while the rotating shaft rotates independently from the outer shell.

In some embodiments, the method further includes applying a press ring to the rotating shaft and configured to secure the seal. The seal may not be attached using any fastener other than the press ring.

In some embodiments, the method further includes aligning the seal with a back end of the outer shell using an adjustment spacer. The adjustment spacer is applied to the rotating shaft between a flange of the rotating shaft and the seal. The press ring provides pressure on the seal against the adjustment spacer to secure the seal.

In some embodiments, a material of the seal is based on a flexibility of the seal corresponding to movement of a back end of the outer shell due to expansion forces experienced as the assembly moves at hypersonic speeds. The material of the seal is based on a friction coefficient of the material.

In some embodiments, a maximum length of the seal is based on an expansion of a radius of the rotating shaft due to dynamic loads and a reduced thickness of the outer shell. A minimum length of the seal is based on a contraction of a radius of the rotating shaft due to dynamic loads and a regular thickness of the outer shell.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
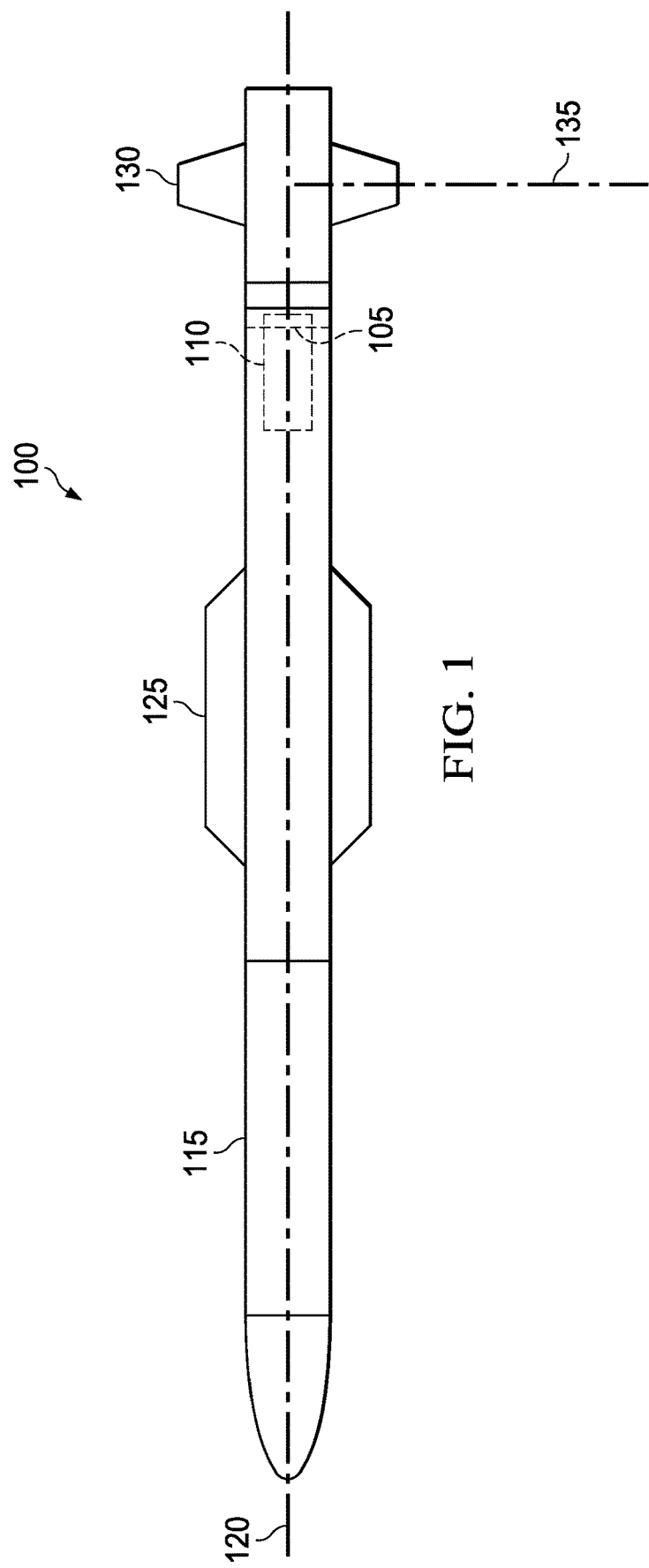
FIG. 1 illustrates an example schematic representation of a projectile incorporating a hypersonic seal on a shaft according to this disclosure.
Figure 2:
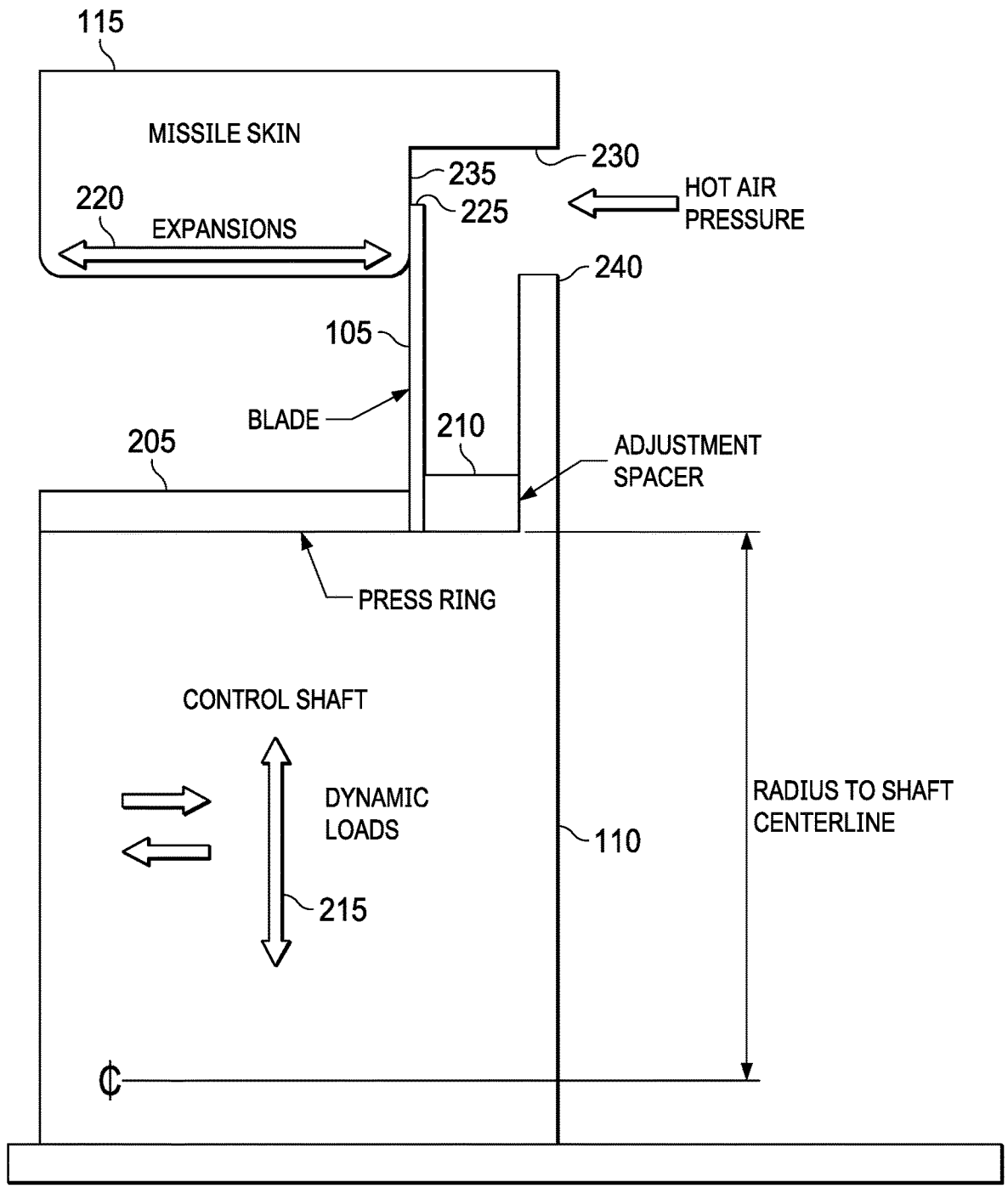
FIG. 2 illustrates an example hypersonic seal according to this disclosure.
Figure 3:
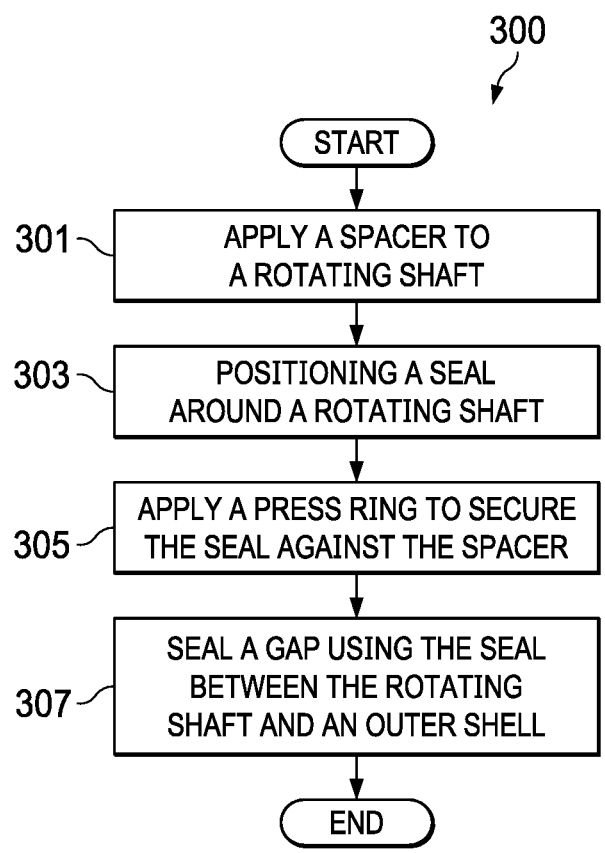
FIG. 3 illustrates an example method for assembling a projectile with a compact low friction high temperature shaft seal according to this disclosure.

FIGS. 1 through 3, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

As discussed above, the internal components of a supersonic projectile can be exposed to an outside of an outer shell of the projectile through gaps between moving or rotating components. The temperature of the air around the projectile can generate heat through friction at a magnitude to damage sensitive components within the projectile.

FIG. 1 illustrates an example schematic representation of a projectile 100 incorporating a hypersonic seal 105 on a shaft 110 according to this disclosure. Note that the embodiment of the projectile 100 illustrated in FIG. 1 is for illustration only, and the sizes, numbers, and arrangements of components comprising the projectile 100 can vary widely. Thus, FIG. 1 does not limit the scope of this disclosure to any particular implementation of a projectile.

Referring to FIG. 1, the projectile 100 generally has a cylindrical outer shell 115 with a longitudinal axis 120. Multiple fins 125 and 130 extend from the surface of the outer shell 115 to help control the projectile path during flight. In particular, the fixed fins 125 provide stability during flight of the projectile 100. The projectile 100 includes a plurality of steering control fins 130 toward a rear end of the projectile 100 that are rotatable about a fin axis 135 transverse the longitudinal axis 120, and typically perpendicular to the longitudinal axis 120.

Although FIG. 1 illustrates examples of projectile 100 incorporating a hypersonic seal on a shaft, various changes may be made to FIG. 1. For example, a projectile may have any suitable number of fins in any suitable arrangement, and the fins on the projectile may or may not be identical.

FIG. 2 illustrates an example hypersonic seal 105 according to this disclosure. Note that the embodiment of the defective hypersonic seal 105 illustrated in FIG. 2 is for illustration only. FIG. 2 does not limit the scope of this disclosure to any particular implementation of a projectile.

As shown in FIG. 2, the projectile 100 can include the hypersonic seal 105, the shaft 110, the outer shell 115, a press ring 205, and an adjustment spacer 210. The shaft 110 is a cylindrical shaft that rotates inside of the outer shell 115. In certain circumstances, the shaft 110 can exceed three inches in diameter. As the diameter increases, the potential expansion of the hypersonic seal 105 increases.

To add to the complexity, the gap between the shaft 110 and the outer shell 115 can be equal to or less than a quarter inch. The narrow gap adds to the complexity of providing a seal meant for independently rotating components. This is assuming that the projectile 100 is not in a fixed position.

The narrow gap also is affected by the forces placed upon the projectile on both the shaft 110 and the outer shell 115. The shaft 110 can experience dynamic forces 215 that expand or contract a radius/diameter of the shaft 110. The outer shell 115 can experience expansion forces 220 that extend or contract a length of the outer shell 115. Both of the dynamic forces 215 and the expansion forces 220 cause a reduction or expansion of the gap that is to be accounted for by the seal 105. A distance between a free end 225 of the seal 105 and a narrowed portion 230 of the outer shell 115 needs to be considered when designing a length of the seal 105. In particular the distance between the free end 225 of the seal 105 and the narrowed portion 230 of the outer shell 115 should be based on expansion properties of the shaft 110. Also, the distance is also affected by the regular inner diameter of the outer shell 115. Because the dynamic forces 215 could potentially reduce the radius/diameter of the shaft 110, a minimum length of the seal 105 should be based on any potential compressive force of the dynamic forces 215 to ensure that the free end 225 of the seal 105 contracts within the regular inner diameter of the outer shell 115. If the shaft 110 contracted enough for the free end 225 of the seal 105 to be within the regular inner diameter of the outer shell 115, the hot air pressure could cause the seal 105 to flex within the gap allowing the hot air to get to the internal components.

Both the thickness and flexibility of the seal 105 are taken into consideration based on the expansion forces of the outer shell 115. In some embodiments, the seal 105 can be very thin, e.g., a size of 0.004-0.15 inches based on a 0.25 inch gap. The seal 105 can flex with a back end 235 of the outer shell 115 due to the expansion forces of the outer shell 115. As non-limiting examples, the materials for the seal could include titanium, inconel, TZM, or high temperature composite materials. The friction coefficient of the materials is also considered due to the rotation of the shaft independent from the outer shell. The material needs a low friction coefficient to handle the force and rotation of the seal against the back end 235 of the outer shell 115. The seal 105 can provide sealing from the hot air pressure without adding large amount of friction that would degrade performance of the projectile 100.

The back end 235 and the narrowed portion 230 of the outer shell 115 are designed to accommodate a flange 240 of the shaft 110. Due to the flange 240, the gap is accounted for by an adjustment spacer 210. The adjustment spacer 210 is designed with a width that allows the seal 105 to be aligned with the back end 235 of the outer shell 115.

A press ring 205 is applied to the secure the seal 105 in alignment with the back end 235 of the outer shell 115. The press ring 205 allows the seal 105 to be press fit without the use of a fastener.

Although FIG. 2 illustrates one example of a hypersonic seal 105, various changes may be made to FIG. 2. For example, FIG. 2 is merely meant to illustrate one example way in which a hypersonic seal 105 might be attached to a shaft 110.

FIG. 3 illustrates an example method 300 for assembling a projectile with a compact low friction high temperature shaft seal according to this disclosure. For ease of explanation, the method 300 is described as being performed to attach the hypersonic seal 105 on a shaft as illustrated in FIG. 2. However, the method 300 can be used to assemble the hypersonic seal 105 on a rotatable component with a large outer diameter.

As shown in FIG. 3, a spacer 210 is applied to a rotating shaft 110 at step 301. This may include, for example, applying the spacer 210 around a rotating shaft 110 against a flange 240 of the spacer 210. The seal 105 is aligned with a back end 235 of the outer shell 115 by the spacer 210. A width of the spacer 210 is based on the gap between the back end 235 of the outer shell 115 and the flange 240 of the rotating shaft 110.

A seal 105 is positioned around a rotating shaft at step 303. This may include, for example, positioning the seal 105 around the rotating shaft 110 against the spacer. The seal 105 can be made of a material based on a flexibility of the seal 105 corresponding to movement of a back end 235 of the outer shell 115 due to expansion forces experienced as the projectile 100 moves at hypersonic speeds. The material of the seal 105 can also be based on a friction coefficient of the material. A maximum length of the seal 105 is based on an expansion of a radius of the rotating shaft 110 due to dynamic loads and a reduced thickness of the outer shell 115. A minimum length of the seal 105 is based on a contraction of a radius of the rotating shaft 110 due to dynamic loads and a regular thickness of the outer shell 115.

A press ring 205 is applied around the rotating shaft 110 to secure the seal 105 against the spacer at step 305. This may include, for example, applying the press ring 205 around a rotating shaft 110 to put a force against an inside portion of the seal 105 against the spacer 210.

A gap is sealed by the seal 105 between the rotating shaft 110 and the outer shell 115 at step 307. This may include, for example, the seal 105 extending across a gap between the rotating shaft 110 and the outer shell 115. A free end 225 of the seal 105 extends past a regular inner circumference of the outer shell 115.

Although FIG. 3 illustrates one example of a method 300 for assembling a projectile with a compact low friction high temperature shaft seal, various changes may be made to FIG. 3. For example, while shown as a series of steps, various steps shown in FIG. 3 may overlap, occur in parallel, occur in a different order, or occur multiple times. Moreover, some steps may be combined, further subdivided, or removed and additional steps may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An assembly comprising:
   an outer shell including a first inner surface extending with a first inner diameter, a second inner surface extending with a second inner diameter, and a back end surface radially extending between the first inner surface and the second inner surface;
   a rotating shaft inside the outer shell and configured to rotate independently of the outer shell; and
   a seal shaped as a flat ring comprising a set of parallel planar surfaces attached to the rotating shaft and configured to seal a gap between the outer shell and the rotating shaft by directly contacting one of the parallel planar surfaces to the back end surface of the outer shell, wherein a maximum length of the seal is based on an expansion of a radius of the rotating shaft due to dynamic loads and a reduced thickness of the outer shell.

2. The assembly of claim 1, further comprising:
   a press ring applied to the rotating shaft and configured to secure the seal to the rotating shaft.

3. The assembly of claim 2, wherein the seal is not attached using any fasteners other than the press ring.

4. The assembly of claim 2, further comprising:
   an adjustment spacer configured to align the seal with the back end surface of the outer shell.

5. The assembly of claim 4, wherein the adjustment spacer is positioned on the rotating shaft between a flange of the rotating shaft and the seal.

6. The assembly of claim 4, wherein the press ring provides pressure on the seal against the adjustment spacer to secure the seal.

7. The assembly of claim 1, wherein a material of the seal is based on a flexibility of the seal corresponding to movement of the back end surface of the outer shell due to expansion forces experienced as the assembly moves at hypersonic speeds.

8. The assembly of claim 1, wherein a material of the seal is based on a friction coefficient of the material.

9. The assembly of claim 1, wherein a maximum length of the seal is based on an expansion of a radius of the rotating shaft due to dynamic loads and a reduced thickness of the outer shell.

10. The assembly of claim 1, wherein a minimum length of the seal is based on a contraction of a radius of the rotating shaft due to dynamic loads and a regular thickness of the outer shell.

11. A method for assembling a projectile with a compact low friction high temperature shaft seal, the projectile including (i) an outer shell including a first inner surface extending with a first inner diameter, a second inner surface extending with a second inner diameter, and a back end surface radially extending between the first inner surface and the second inner surface and (ii) a rotating shaft inside the outer shell, the method comprising:
   attaching a seal shaped as a flat ring comprising a set of parallel planar surfaces to the rotating shaft; and
   sealing a gap between the outer shell and the rotating shaft using the seal to directly contact one of the parallel planar surfaces to the back end surface of the outer shell while permitting the rotating shaft to rotate independently from the outer shell.

12. The method of claim 11, further comprising:
   applying a press ring to the rotating shaft, the press ring configured to secure the seal to the rotating shaft.

13. The method of claim 12, wherein the seal is not attached using any fasteners other than the press ring.

14. The method of claim 12, further comprising:
   aligning the seal with the back end surface of the outer shell using an adjustment spacer.

15. The method of claim 14, wherein the adjustment spacer is positioned on the rotating shaft between a flange of the rotating shaft and the seal.

16. The method of claim 14, wherein the press ring provides pressure on the seal against the adjustment spacer to secure the seal.

17. The method of claim 11, wherein a material of the seal is based on a flexibility of the seal corresponding to movement of the back end surface of the outer shell due to expansion forces experienced as the projectile moves at hypersonic speeds.

18. The method of claim 11, wherein a material of the seal is based on a friction coefficient of the material.

19. The method of claim 11, wherein a maximum length of the seal is based on an expansion of a radius of the rotating shaft due to dynamic loads and a reduced thickness of the outer shell.

20. The method of claim 11, wherein a minimum length of the seal is based on a contraction of a radius of the rotating shaft due to dynamic loads and a regular thickness of the outer shell.

* * * * *